United States Patent
Byford et al.

(10) Patent No.: US 7,471,956 B2
(45) Date of Patent: Dec. 30, 2008

(54) METHOD AND SYSTEM FOR DETERMINING THE LOCATION OF AN IMPROVED CARRIER SIGNAL

(75) Inventors: Derrick J. Byford, London (GB); Richard Lanyon-Hogg, Woburn Sands (GB)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 11/117,758

(22) Filed: Apr. 28, 2005

(65) Prior Publication Data

US 2005/0245275 A1  Nov. 3, 2005

(30) Foreign Application Priority Data

Apr. 30, 2004  (GB) ................ 0409617.8

(51) Int. Cl.
*H04Q 7/20* (2006.01)

(52) U.S. Cl. .............. 455/456.6; 455/456.3; 455/67.13; 455/67.7; 455/414.2

(58) Field of Classification Search .............. 455/115.1, 455/67.11, 446, 414.1–414.4, 456.1–456.6, 455/457, 722, 1, 421, 67.13, 67.7
See application file for complete search history.

(56) References Cited

U.S. PATENT DOCUMENTS

| | | | | |
|---|---|---|---|---|
| 6,006,089 | A * | 12/1999 | Sasaki et al. ................. | 455/423 |
| 6,038,444 | A * | 3/2000 | Schipper et al. .............. | 455/421 |
| 6,272,316 | B1 * | 8/2001 | Wiedeman et al. .......... | 455/13.1 |
| 6,438,363 | B1 * | 8/2002 | Feder et al. ................. | 455/226.4 |
| 6,484,205 | B1 * | 11/2002 | Byford ........................ | 709/227 |
| 6,487,410 | B1 * | 11/2002 | Kontio et al. ................ | 455/437 |
| 6,771,609 | B1 * | 8/2004 | Gudat et al. ................. | 370/254 |
| 6,909,902 | B1 * | 6/2005 | Sawada et al. ............ | 455/456.1 |
| 7,043,275 | B2 * | 5/2006 | Matsuoka et al. ......... | 455/562.1 |
| 7,110,768 | B1 * | 9/2006 | Bridges et al. .............. | 455/446 |
| 7,113,753 | B2 * | 9/2006 | Cotanis .................... | 455/115.1 |
| 7,142,870 | B2 * | 11/2006 | Kim ........................ | 455/456.1 |

(Continued)

FOREIGN PATENT DOCUMENTS

WO  WO 03/058985 A2  7/2003

(Continued)

OTHER PUBLICATIONS www.computerweekly.com, Article 102135.htm, IT Management: E-Business, "Location, Location, Location", May 22, 2001.

(Continued)

*Primary Examiner*—Charles N Appiah
*Assistant Examiner*—Joy K. Contee
(74) *Attorney, Agent, or Firm*—Norman L. Gundel; Hoffman Warnick LLC

(57) ABSTRACT

A method for determining the location of an improved carrier signal emitted by a base station relative to the position of a communication device, the carrier signal having a signal strength, and the communication device having access to a digital map. A determination is made to determine the signal strength of the carrier signal at the current location of the communication device; locating an adjacent location on the digital map and determining the signal strength at the adjacent location; and in response to a greater signal strength being determined at the adjacent location, displaying the direction of the position of the adjacent location on the communication device.

22 Claims, 6 Drawing Sheets

U.S. PATENT DOCUMENTS

| | | | | |
|---|---|---|---|---|
| 7,167,679 B2 * | 1/2007 | Sano | ............................ | 455/41.2 |
| 2003/0187523 A1 * | 10/2003 | Smith et al. | ..................... | 700/83 |
| 2004/0166811 A1 * | 8/2004 | Moon | ........................ | 455/67.11 |
| 2004/0176111 A1 * | 9/2004 | Wihelm | .................... | 455/456.6 |
| 2006/0229087 A1 * | 10/2006 | Davis et al. | ............... | 455/456.1 |
| 2006/0276204 A1 * | 12/2006 | Simpson et al. | ........... | 455/456.5 |
| 2007/0161383 A1 * | 7/2007 | Caci | ............................ | 455/457 |

FOREIGN PATENT DOCUMENTS

| | | |
|---|---|---|
| WO | WO 03/058986 A2 | 7/2003 |
| WO | WO 03/065740 A2 | 8/2003 |

OTHER PUBLICATIONS

Tim Kridel, "What's Inside Counts", Wireless Review, Jun. 1, 2000.

* cited by examiner

1m North

515

METHOD AND SYSTEM FOR DETERMINING THE LOCATION OF AN IMPROVED CARRIER SIGNAL

FIELD OF THE INVENTION

The invention relates to the field of telecommunications and in particular to a method and system for determining the location of an improved carrier signal relative to the position of a communication device and displaying the direction of the improved carrier signal on a display means of the communication device.

BACKGROUND OF THE INVENTION

Most wireless network service providers offer a high percentage of network coverage to their customers. This often means, depending on the size of the country, that wireless network service providers deploy in access of 10,000 transmitters in order to provide a high quality service to their customers. Often, higher network coverage is provided within highly populated areas with the poorest network coverage falling within less populated rural areas.

In order to inform customers of the geographical locations of the best network coverage, wireless network service providers often provide their customers with a map illustrating areas of high quality coverage, variable coverage or no coverage at all. Often, a coverage map does not provide the level of detail required by a customer. For example, when using a mobile phone in an area of variable quality network coverage, the map provides a vague indication of where the nearest area of high quality coverage may be found. For example, the map may indicate that an area of high quality coverage is located near the area of variable quality coverage. Therefore, a customer is unsure whether they have to drive 5 minutes, 10 minutes or 30 minutes, or indeed in which direction to travel, in order to find improved quality signal strength in order to make a phone call or to access the Internet.

A further problem arises due to some wireless network service providers transmitting signals at a high frequency, which causes the signal to be blocked by walls in certain types of buildings. Part of the problem is caused by many modern office buildings using metal studs rather than wood fixings to construct partition walls or using metallic filing cabinets which greatly reduce signal strength because of their absorption characteristics. Further, at high signal frequencies some wall covering's absorption and reflection characteristics also become contributory factors in variable signal strength.

With so many variables, assessing network coverage is a complicated task. Some service providers perform cursory testing by walking around a location with a handset operating in test mode, identifying the areas of signal strength. The above problems have led to consumers walking aimlessly around their office buildings or homes etc., trying to locate a carrier signal on their communication devices.

Therefore this is a need for a solution to this problem, which provides a method for determining the location of an improved carrier signal relative to the position of a communication device and displaying the direction of the improved carrier signal on a display means of the communication device.

SUMMARY OF THE INVENTION

Viewed from a first aspect, the present invention provides a method for determining a location of an improved carrier signal emitted from a base station relative to a position of a communication device, the carrier signal having a signal strength and the communication device receiving signal strength information of the carrier signal from a network, the method comprising the steps of: receiving information of a signal strength at an adjacent location; and in response to the received information of an improved signal strength being received at the adjacent location, displaying a direction of a position of the adjacent location on the communication device.

The invention advantageously allows a user of a communication device to locate the location of an improved signal strength being emitted from a base station relative to the current position of the communication device. Initially, the invention determines the signal strength currently being received by the communication device at its current location. If the signal strength is characterised by a weak signal strength or the signal strength drops below an acceptable level, a lookup is performed on a digital map to locate an adjacent grid reference. Alternatively the signal strength may be obtained from the communication device itself as transmitted from base stations. Using the information stored on the digital map or other means a further lookup is performed to determine the signal strength being emitted by a number of base stations within the digital map. It is likely that many base stations reside in a particular grid reference and the many base stations may belong to the same or different network service providers.

Within a particular grid reference there may be a varying terrain, for example, mountains, buildings and rivers. All of these features within the terrain have varying refraction and deflection characteristic that may affect the direction and strength of the radio signal being emitted from the base station and received by a communication device. Thus, a further calculation is performed to calculate the refraction and deflection characteristics of the features of the terrain.

Using the above statistical information the direction of an improved signal strength in relation to the signal strength currently being received by the communication device is calculated.

The statistical information is sent to a builder component located either at the network service provider or on the communication device itself. The builder component may display the results on the communication device in a number of ways.

Preferably the present invention displays an icon on the communication device depicting the direction of the improved signal strength.

Preferably the present invention provides a method wherein a graphical map displays the direction of the improved signal strength. Alternatively the direction of the improved signal strength may be given via verbal instructions from the communication device.

Preferably the present invention provides a method wherein the comparison of the signal strengths returns a ranked list of locations of improved signal strengths.

Viewed from a second aspect the present invention provides a system for determining a location of an improved carrier signal emitted from a base station relative to a position of a communication device, the carrier signal having a signal strength and the communication device receiving signal strength information of the carrier signal from a network, the system comprising: means for receiving information of a signal strength at an adjacent location; and in response to the received information of an improved signal strength being received at the adjacent location, means for displaying the direction of a position of the adjacent location on the communication device.

Viewed from a third aspect the present invention provides a computer program product loadable into the internal memory of a digital computer, comprising software code portions for performing, when said product is run on a computer, the method of the invention as described above.

Viewed from a fourth aspect the invention provides a service for determining a location of an improved carrier signal emitted from a base station relative to a position of a communication device, the carrier signal having a signal strength and the communication device receiving signal strength information of the carrier signal from a network, the system comprising: receiving information of a signal strength at an adjacent location; and in response to the received information of an improved signal strength being received at the adjacent location, means for displaying a direction of a position of the adjacent location on the communication device.

A service provider may charge an additional fee for use of the service offered by the invention. The invention may be a service by which a user of a communication device sends a text message to the service provider requesting the service or alternatively the invention may be provided by a downloadable application from the service provider's web site. Varying levels of pricing may be offered depending on the type of display means the user wishes to use.

The service provider may provide a variety of maps for use with the communication device, for example, a map of an office building detailing the locations within the office of different signal strengths. The invention is then able to determine the direction of the location of an improved signal strength. By using different maps for different locations the absorption, refraction and deflection characteristics of structures within the office building may be utilised.

BRIEF DESCRIPTION OF THE DRAWINGS

Embodiments of the invention are described below in detail, by way of example only, with reference to the accompanying drawings in which.

DETAILED DESCRIPTION OF THE INVENTION

Figure 1:
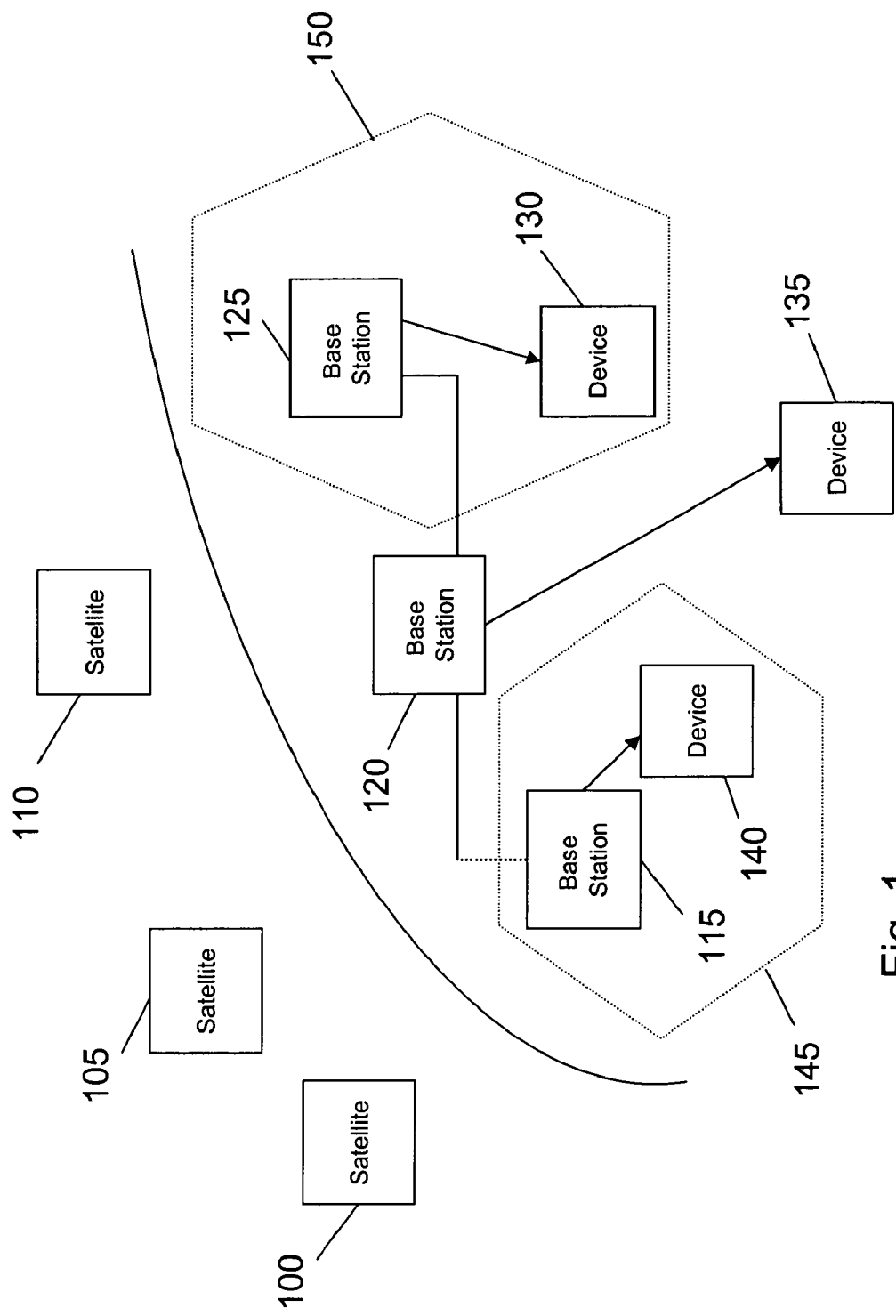
FIG. 1 shows the components that comprise a wireless network as is known in the prior art.

FIG. 1 depicts a simplified block diagram illustrating a wireless communication system as is known in the prior art.

The wireless communication system comprises a plurality of wireless communication devices 140, 135 and 130. A wireless communication device may be defined as a mobile telephone, a pager, a personal digital assistant (PDA) or any other type of wireless communication device, etc. For clarity, a wireless communication device will be described as a communication device for the remainder of the specification and is intended to encompass the non-exhaustive list above.

A wireless communication network is organized into cells 145, 150 and each cell comprises a base station 115, 120 and 125 which controls the frequency band at which the communication devices 140, 130, 135 can transmit. The communication devices 140, 130, 135 communicate with a mobile transmitter and receiver located in each cell 145, 150.

Each base station 115, 120, 125 comprises a mobile switching center (MSC) for locating and coordinating the frequencies used by different communication devices and cell transmitters.

As a communication device 140, 135, 130 moves out of a cell (for example, moving from cell 145 to cell 150) the MSC determines which cell 145, 150 is the most appropriate cell to take control of the communication device.

The MSC communicates with all communication devices 140, 135, 130 in the areas of the base stations which it controls by means of a control channel. The control channel allows the MSC to send instructions to the communication devices 140, 135, 130. The MSC contacts each adjacent cell and instructs it to measure the signal strength of the wireless device. The results are transmitted back to the MSC and the strongest signal and the selected cell 145, 150 are determined.

In another embodiment the wireless communication network may further comprise a number of satellites 100, 105, 110 orbiting around the earth for use as a Global Position System (GPS) for locating the position of a plurality of wireless devices 140, 135, 130.

Further, as more and more devices such as laptops and PDAs embody wireless connectivity capabilities, the invention is equally operable in a network such as, a WiFi network.

Figure 2:
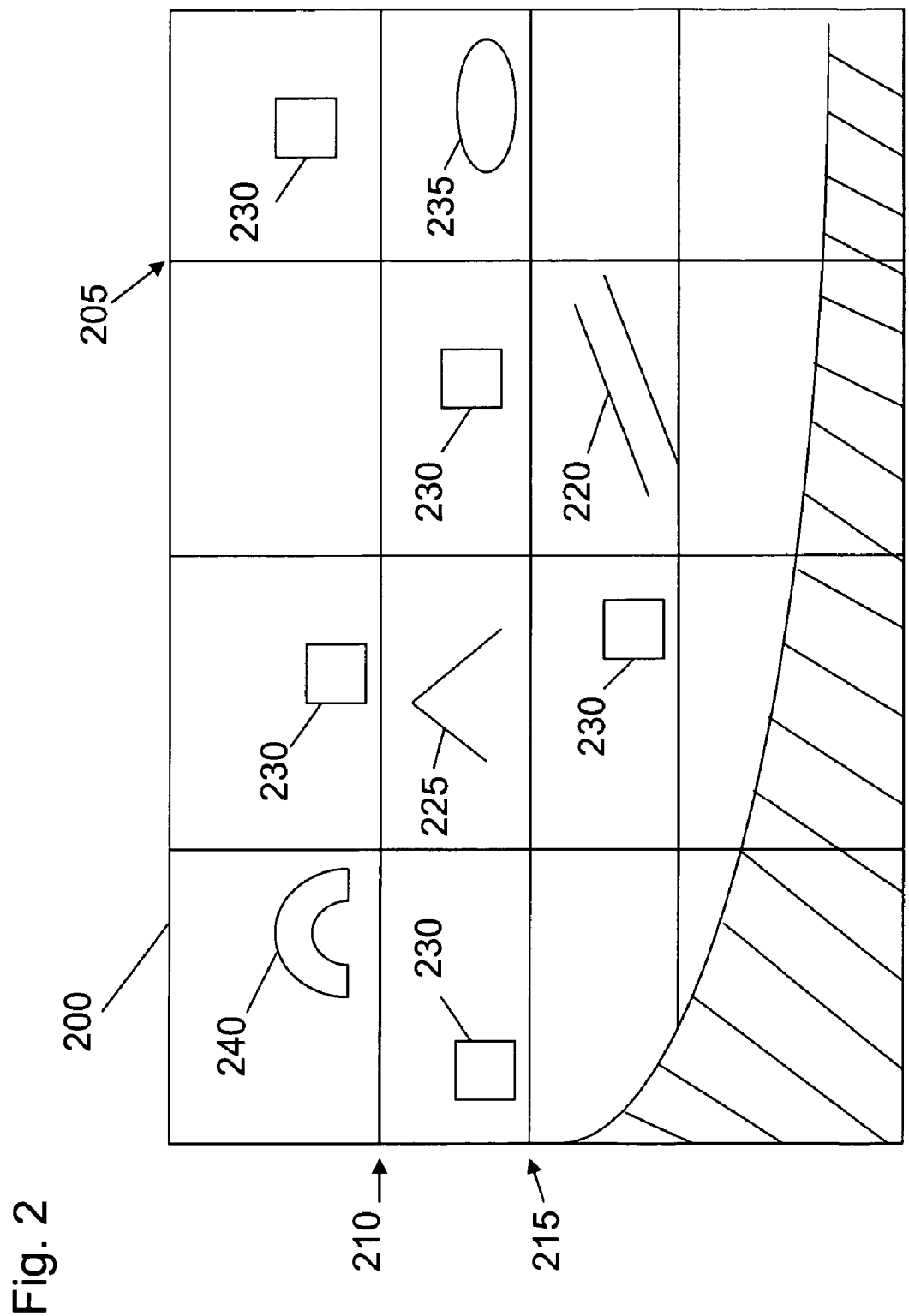
FIG. 2 illustrates a digital map as maintained by a service provider for illustrating the location of the service provider's base station.

Moving on to FIG. 2, each wireless network service provider uses a digital geographical map 200 to plot the location of each of their base stations 115, 120, 125. The digital geographical map 200 may also provide information such as the radio path of each base station 115, 120, 125, signal loss, and hardware information, for example, base station type and capacity.

The geographical digital map 200 is divided by longitude and latitude grid references 205, 210, 215. Each grid reference signifies a unique area on the digital geographical map 200. The digital geographical map 200 illustrates landmarks, for example, roads 220, mountains 225, housing estates 220, lakes 235, and tunnels 240.

An advantage of using a geographical digital map 200 is that it is possible to view a geographical area from an elevation view. The elevation view may graphically profile each radio path showing a side view of the terrain that the radio signals must traverse, for example buildings, a forest, or roads, etc.

Therefore, by using the grid reference of a digital geographical map 200 a wireless network service provider may locate a base station and obtain statistical information about the base station and its operational performance.

Once the wireless network service provider obtains the above information, the wireless network service provider calculates the signal strength of a carrier signal throughout a particular grid reference 205, 210, 215 emitted by a base station within the same grid reference. There are many ways in which this may be achieved. For example, a mathematical model may be used which calculates the effect that different geographical features, as depicted by the geographical digital map 200, has on the signal strength transmitted by a base station, for example, how buildings reflect or diffract radio signals.

The mathematical models for calculating the reflection or diffraction of signals are well known in the art and will not be explained any further.

Figure 3:
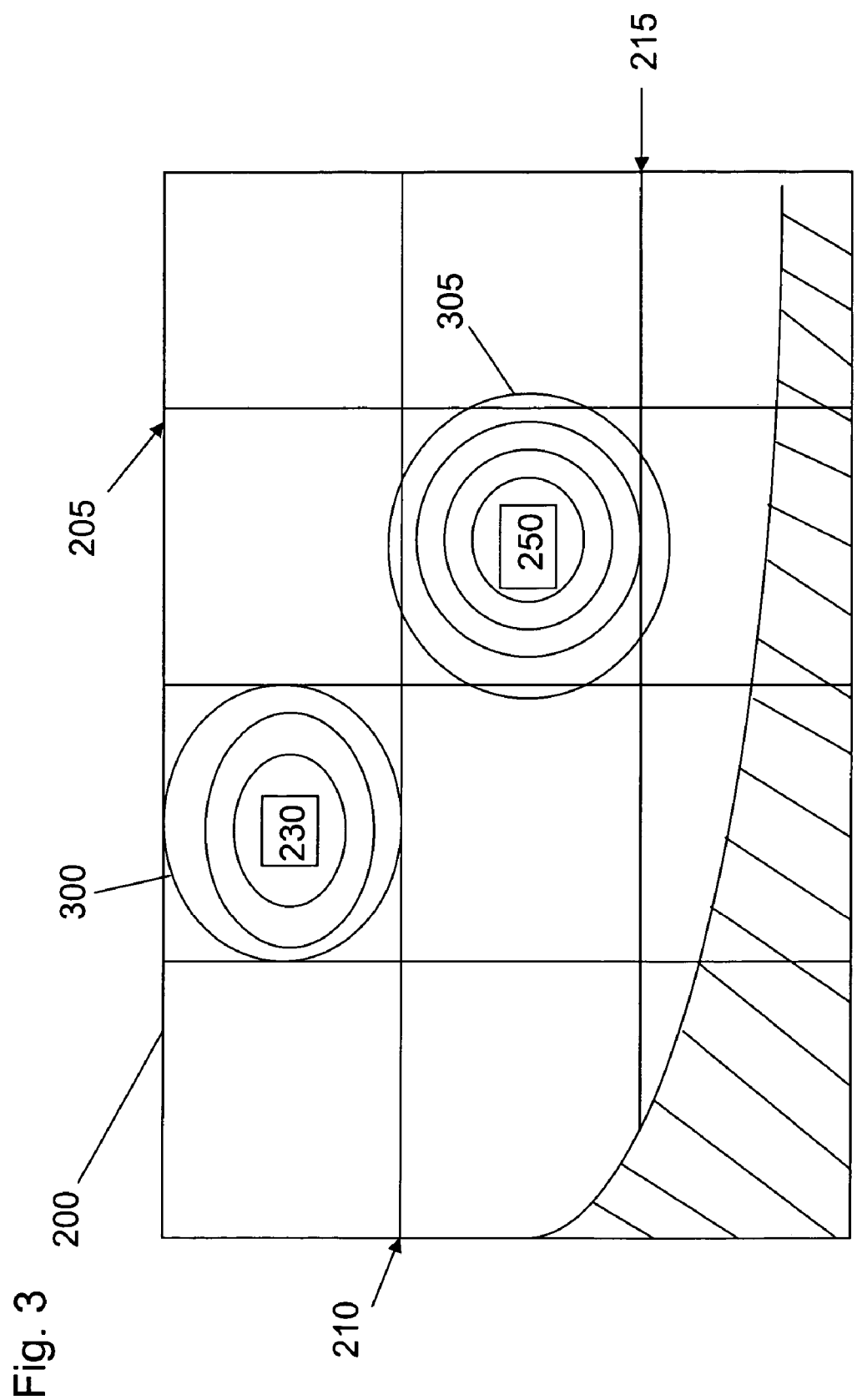
FIG. 3 illustrates the digital map of FIG. 2 with the additional feature of signal strengths for each base station.

The derived statistical data of signal strength may then by overlayed onto the geographical digital map 200 of FIG. 2, as can be seen in FIG. 3, reference numerals 300 and 305. Once a communication device 140, 135, 130 moves into a cell 145, 150, a lookup is performed on the digital map 200 to determine the signal strength of the communication device. The signal strength of the communication signal may be displayed on the communication device 140, 135, 130 as an iconic representation of the signal strength.

As a user of a communication device 140, 135, 130 moves around a geographical area, the communication device 140, 135, 130 may receive variable signal strength, due to the radio signals being blocked or affected by the terrain within the area or by diffraction and reflection from buildings. In order to direct a user of the communication device to an improved signal strength compared to the signal strength currently being received at their current location, firstly, the current position of the wireless device is detected as detailed by step 400 of FIG. 4.

In one embodiment, the location of the wireless device may be achieved by using GPS. GPS uses a method of triangulation to calculate the position of the communication device.

In another embodiment a 'time of signal arrival' (TSA) algorithm may be utilised. The time taken for the radio signals to be transmitted between the communication device 140, 135, 130 and each of at least three nearby base stations is compared and the average time of signal to arrive is calculated to locate the position of the communication device 140, 135, 130.

Once the location of the communication device 140, 135, 130 is determined, a lookup is performed on the digital map 200 to identify the grid reference of the current location of the communication device 140, 135, 130 at step 405. A further lookup is performed to determine the signal strength at the identified particular grid reference.

The digital map 200 may be stored and maintained by the service provider or in another embodiment the digital map 200 may be downloaded and stored on the communication device 140, 135, 130.

A variety of digital maps may be available for use by the communication device, for example, a digital map of an office building or an area of residence may be installed on the communication device, offering a higher granularity of signal strength recognition taking into account the refraction and diffraction characteristics of the building.

At step 410, a determination is made as to whether the signal strength is a weak signal strength at the located grid reference or a strong signal strength. A weak signal strength may be characterised by no signal strength being received by the communication device 140, 135, 130. Alternatively a strong signal strength may be characterised by two or more iconic bars displayed on the display of the communication device 140, 135, 130. It will be appreciated by a person skilled in the art that other permutations of signal strengths can be derived and the examples are for illustration purposes only.

If at step 410 the signal strength is determined as a weak signal strength, a further lookup is performed to determine an adjacent grid reference relative to the grid reference of the location of the communication device 140, 135, 130. Once an adjacent grid reference is located a further lookup is performed to determine the signal strength of the adjacent grid reference. A comparison is performed between the grid reference of the area the communication device 140, 135, 130 is located and the adjacent grid reference. If the signal strength of the adjacent grid reference is greater than the grid reference of the communication device 140, 135, 130, control passes to step 415 and the result is interpreted and displayed in a display area on the communication device 140, 135, 130.

Moving back to step 410, if the determination step calculates the signal strength of the adjacent grid reference to be less that the signal strength of the current grid reference, control moves to step 405 and the next adjacent grid reference is located.

The locating of an adjacent grid reference is preferably performed in a 360 degree radius of the position of the communication device 140, 135, 130. The distance between each grid reference (i.e., the scale of the map) may vary from network service provider to network service provider.

Steps 405 to 410 are continually performed until an improved signal strength compared to the signal strength currently being received by the communication device 140, 135, 130 is located.

Turning to step 415, the results may be interpreted and displayed at step 420 in a number of ways. This will be explained with reference to FIGS. 5 and 6A-6C.

Figure 5:
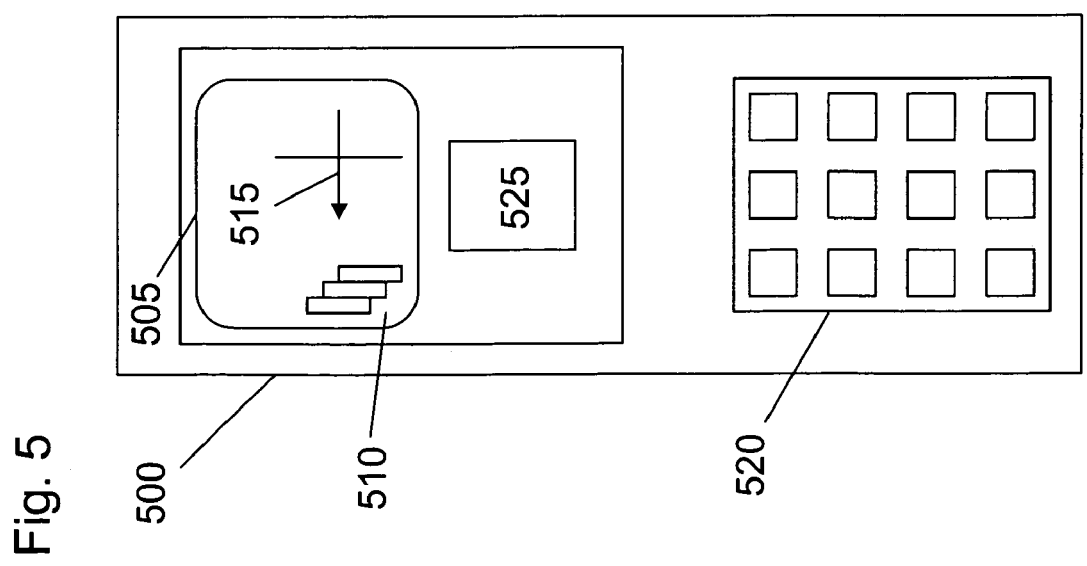
FIG. 5 shows a communication device including a signal strength direction indicator of the invention.

Turning to FIG. 5, a communication device 140, 135, 130 is shown with a display 505 and a keypad 520 for inputting data into the communication device 140, 135, 130. The display 505 shows an icon 510 depicting a signal strength indicator as is known in the art. The signal strength indicator comprises three bars; three bars indicating strong signal strength, two bars variable signal strength, one bar weak signal strength and no bars no signal strength. The communication device may further comprise a display builder component 525 for building a number of output mechanisms, for example, a direction indicator, a route map or a ranked list of signal strengths etc.

Once the determination step, at step 410, has determined an improved signal strength at an adjacent grid reference, the direction of the adjacent grid reference may be mapped onto an iconic representation of a pointer 515 (FIGS. 5 and 6A), pointing in the direction the communication device 140, 135, 130 should move in order to obtain an improved signal strength compared to the signal strength currently being received. The mapping is performed by the builder component 525.

For example, if the adjacent grid reference is west of the position of the communication device, a pointer, pointing in the direction of west will be displayed on the communication device 140, 135, 130. This gives a user of the communication device 140, 135, 130 a clear indication in which direction to move, in order to obtain an improved signal strength.

Figure 4:
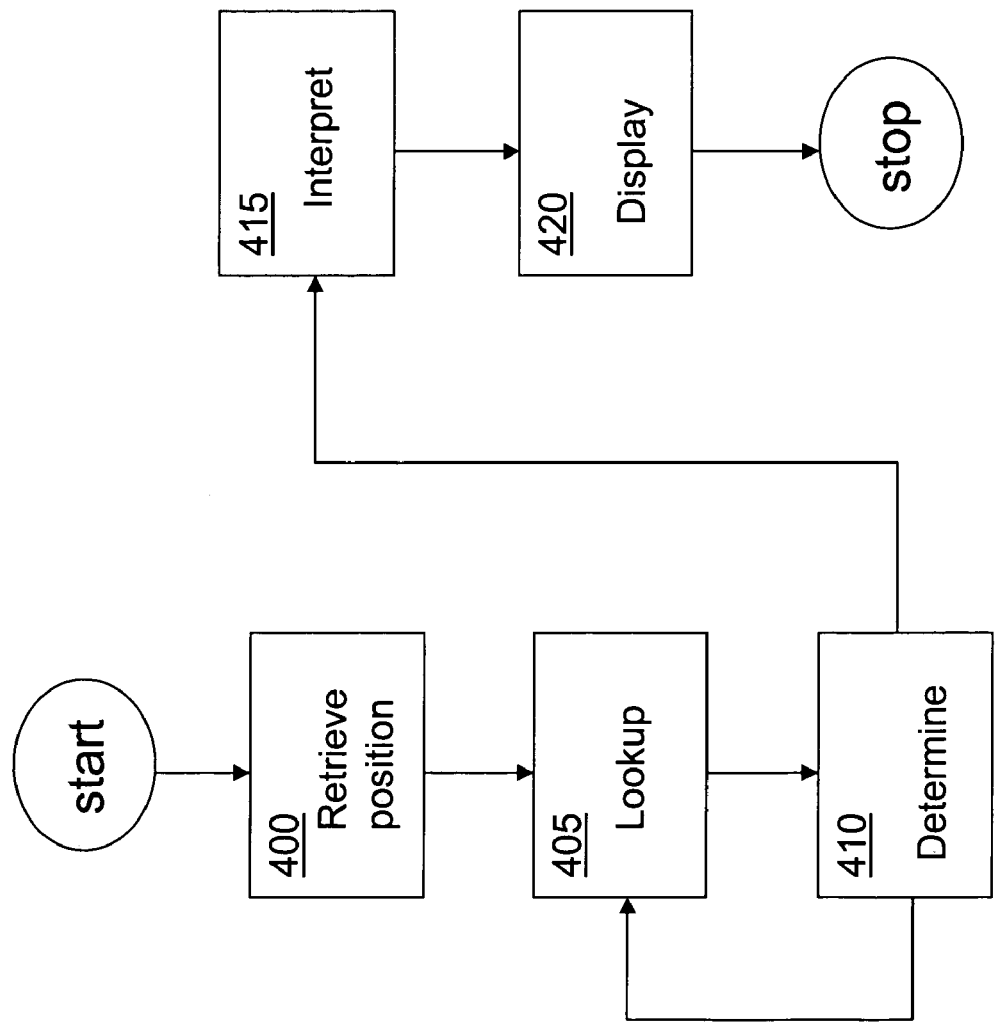
FIG. 4 shows a flow chart illustrating the process steps of the invention.

As the communication device 140, 135, 130 moves around a geographical area, steps 405 to 420 of FIG. 4 are constantly repeated such that the pointer icon 515 is displaying the direction of the strongest signal strength. The pointer may move in a clockwise or counter-clockwise direction (FIG. 6B).

Figure 6C:
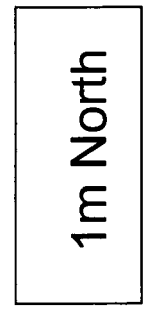
FIGS. 6A-6C show examples of a signal strength direction indicator of the invention.
Figure 6A:
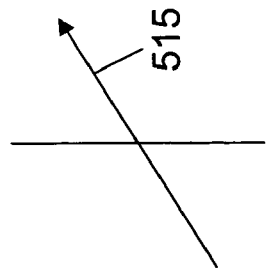
Figure 6B:
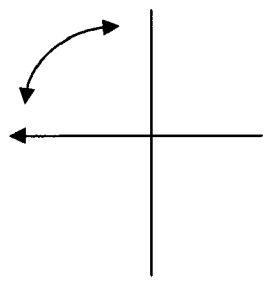

Alternatively, as shown in FIG. 6C the display may be a character string displaying the direction and distance of the strongest signal strength.

Figure 7:
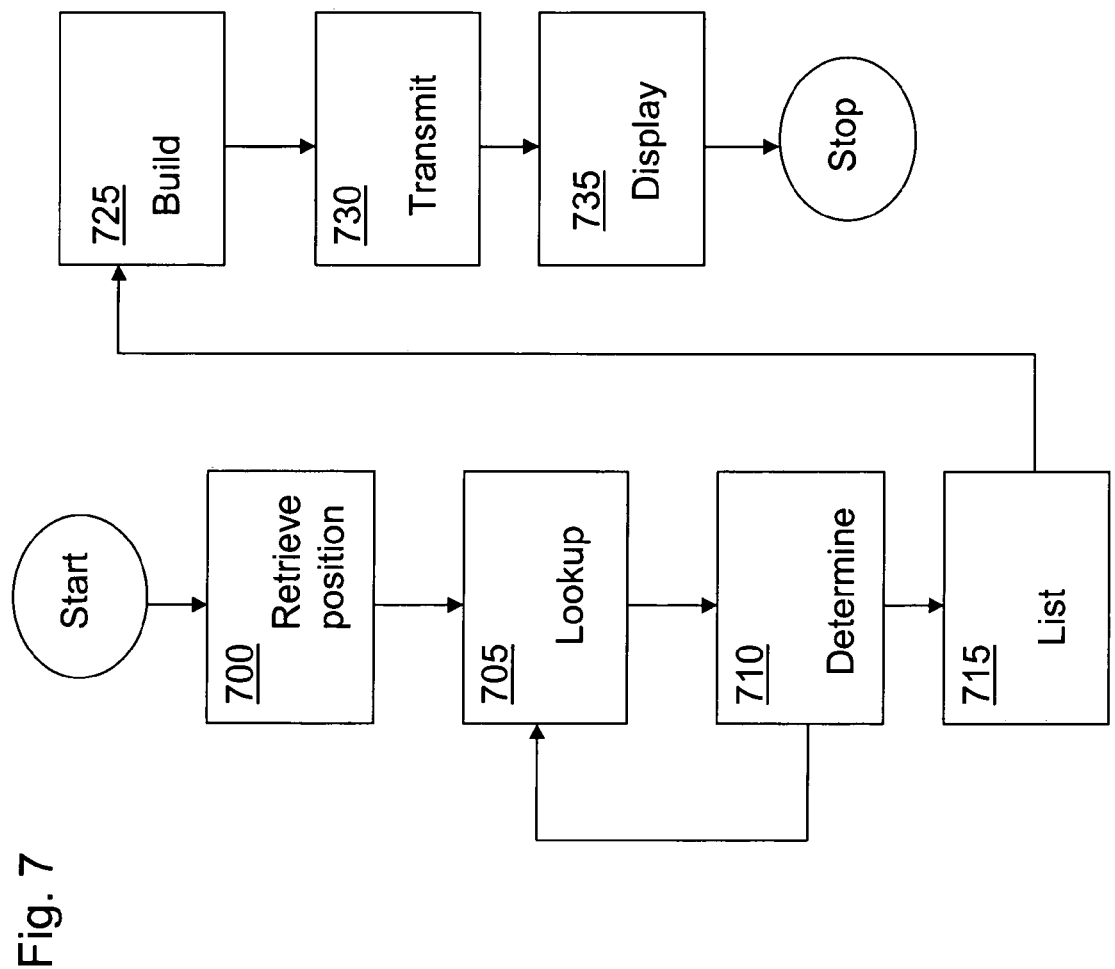
FIG. 7 shows a flow chart illustrating further processing steps of the invention.

Turning to FIG. 7, a further embodiment of the invention is described. At step 700, the position of the communication device 140, 135, 130 is determined by any of the methods as described with reference to FIG. 4. At step 705, a lookup is performed on the digital map 200 to determine the signal strength currently being received by the communication device 140, 135, 130. At step 710, a determination is performed to determine if the signal strength being received by the communication device 140, 135, 130 is a strong signal strength or a weak signal strength. If the signal strength is a weak signal strength, an adjacent cell is located by performing a further lookup within the digital geographical map 200 to locate an adjacent grid reference comprising a base station or other transmitters that boost the signal. Steps 705 to 710 are continually performed until an improved signal strength compared to the signal strength currently being received by the communication device 140, 135, 130 is found.

At step 715, a ranked list of the direction and location of an improved signals strengths may be compiled by the builder component 525 and transmitted to the communication device 140, 135, 130, for example,
1. First floor, location Z
2. Coffee bar, third floor
3. Main reception Alternatively, the communication device 140, 135, 130 may compile the ranked list of signal strengths.

A user may travel to the locations specified in the ranked list to locate an improved signal strength than the signal strength currently being received.

At step 725, the service provider or the communication device may build a map showing a graphical representation of a user's current location and a map instructing a user which direction to travel to obtain an improved signal strength.

The map may be built by the builder component 525 located on the communication device or alternatively a builder component 525 hosted by a network service provider. The map builder component constructs a map of the current location of the communication device; again as previously described, the location of the communication device may be obtained by any number of means. A determination is made to locate an adjacent grid reference and the signal strength of the located adjacent grid reference is determined. Once an improved signal strength is located in relation to the signal strength currently being received by the communication device, the builder component 525 builds a route from the location of the communication device to the location of the improved signal strength. Because of the size and resolution of the display, the map builder breaks the route into sections only displaying a 'follow on' section of the route when it is determined that the communication device is moving out of the route section currently being displayed by the builder component 525.

Once the map is complied by the builder component 525, the builder component 525 transmits the route to a display component on the communication device 140, 135, 130 for displaying at step 735.

Alternatively, the navigation keys of the communication device 140, 135, 130 may be used to navigate around areas of the map or to request the next section of the route map for displaying.

What is claimed is:

1. A method for determining a location of an improved carrier signal emitted from a base station relative to a position of a communication device, the carrier signal having a signal strength and the communication device receiving signal strength information of the carrier signal from an operating wireless communications network, the method comprising the steps of:

receiving information of a signal strength at an adjacent location, wherein the adjacent location is determined by performing a lookup on a digital map, the receiving further comprising determining if the signal strength at the adjacent location is greater than the signal strength at a current location of the communication device, and if the signal strength of the adjacent location is less that of the signal strength at the current location, then locating a next adjacent grid reference in a 360 degree radius from the communication device; and in response the received information of an improved signal strength being received at the adjacent location, displaying a direction of a position of the adjacent location on the communication device.

2. A method as claimed in claim 1 wherein the digital map comprises a grid reference depicting a location of a base station and geographical terrain.

3. A method as claimed in claim 1 wherein the digital map further comprises a signal strength emitted by the base station at a grid reference.

4. A method as claimed in claim 3, wherein the digital map further comprises statistical data comprising refraction and deflection characteristics of the terrain and an effect the statistical data has on the carrier signal strength at the grid reference.

5. A method as claimed in claim 1 wherein the digital map is maintained by a service provider.

6. A method as claimed in claim 5 wherein the digital map is requested from the service provider and stored on the communication device.

7. A method as claimed in claim 1 wherein an icon displays the direction of the adjacent location having improved signal strength on a display of the communication device.

8. A method as claimed in claim 7 wherein the icon is a signal strength direction indicator.

9. A method as claimed in claim 1 wherein a graphical map displays the direction of the adjacent location of the improved signal strength on the communication device.

10. A method as claimed in claim 1 wherein in response to an improved signal strength at the adjacent location, returning a ranked list of adjacent locations of improved signal strengths.

11. A system for determining a location of an improved carrier signal emitted from a base station relative to a position of a communication device, the carrier signal having a signal strength and the communication device receiving signal strength information of the carrier signal from an operating wireless communications network, the system comprising:

means for receiving information of a signal strength at an adjacent location, wherein the adjacent location is determined by performing a lookup on a digital map, wherein the means for receiving comprises means for determining if the signal strength at the adjacent location is greater than the signal strength at a current location of the communication device, and if the signal strength of the adjacent location is less that of the signal strength at the current location, then locating a next adjacent grid reference in a 360 degree radius from the communication device; and in response the received information of an improved signal strength being received at the adjacent location, means for displaying a direction of a position of the adjacent location on the communication device.

12. A system as claimed in claim 11 wherein the digital map comprises a grid reference depicting a location of a base station and geographical terrain.

13. A system as claimed in claim 11 wherein the digital map further comprises a signal strength emitted by the base station at a grid reference.

14. A system as claimed in claim 12, wherein the digital map further comprises statistical data comprising refraction and deflection characteristics of the terrain and an effect the statistical data has on the signal strength at the grid reference.

15. A system as claimed in claim 11 wherein the digital map is maintained by a service provider.

16. A system as claimed in claim 15 wherein the digital map is requested from the service provider and stored on the communication device.

17. A system as claimed in claim 11 wherein an icon displays the direction of the adjacent location having improved signal strength on a display of the communication device.

18. A system as claimed in claim 17 wherein the icon is a signal strength direction indicator.

19. A system as claimed in claim 11 wherein a graphical map displays the direction of the adjacent location of the improved signal strength on the communication device.

20. A system as claimed in claim 11 further comprising means for returning a ranked list of adjacent locations of improved signal strengths, in response to an improved signal strength at the adjacent location.

21. A computer program product loadable into the internal memory of a digital computer, comprising software code portions for performing, when said product is run on a computer, the method of claim 1.

22. A service for determining a location of an improved carrier signal emitted from a base station relative to a position of a communication device, the carrier signal having a signal strength and the communication device receiving signal strength information of the carrier signal from an operating wireless communications network, the service comprising the steps of:

receiving information of a signal strength at an adjacent location, wherein the adjacent location is determined by performing a lookup on a digital map, the receiving further comprising determining if the signal strength at the adjacent location is greater than the signal strength at a current location of the communication device, and if the signal strength of the adjacent location is less that of the signal strength at the current location, then locating a next adjacent grid reference in a 360 degree radius from the communication device; and in response to the received information of an improved signal strength being received at the adjacent location, displaying a direction of a position of the adjacent location on the communication device.

* * * * *